Jan. 13, 1931.  F. PENZA  1,788,689
METHOD AND APPARATUS FOR MAKING MACARONI
Filed May 28, 1930
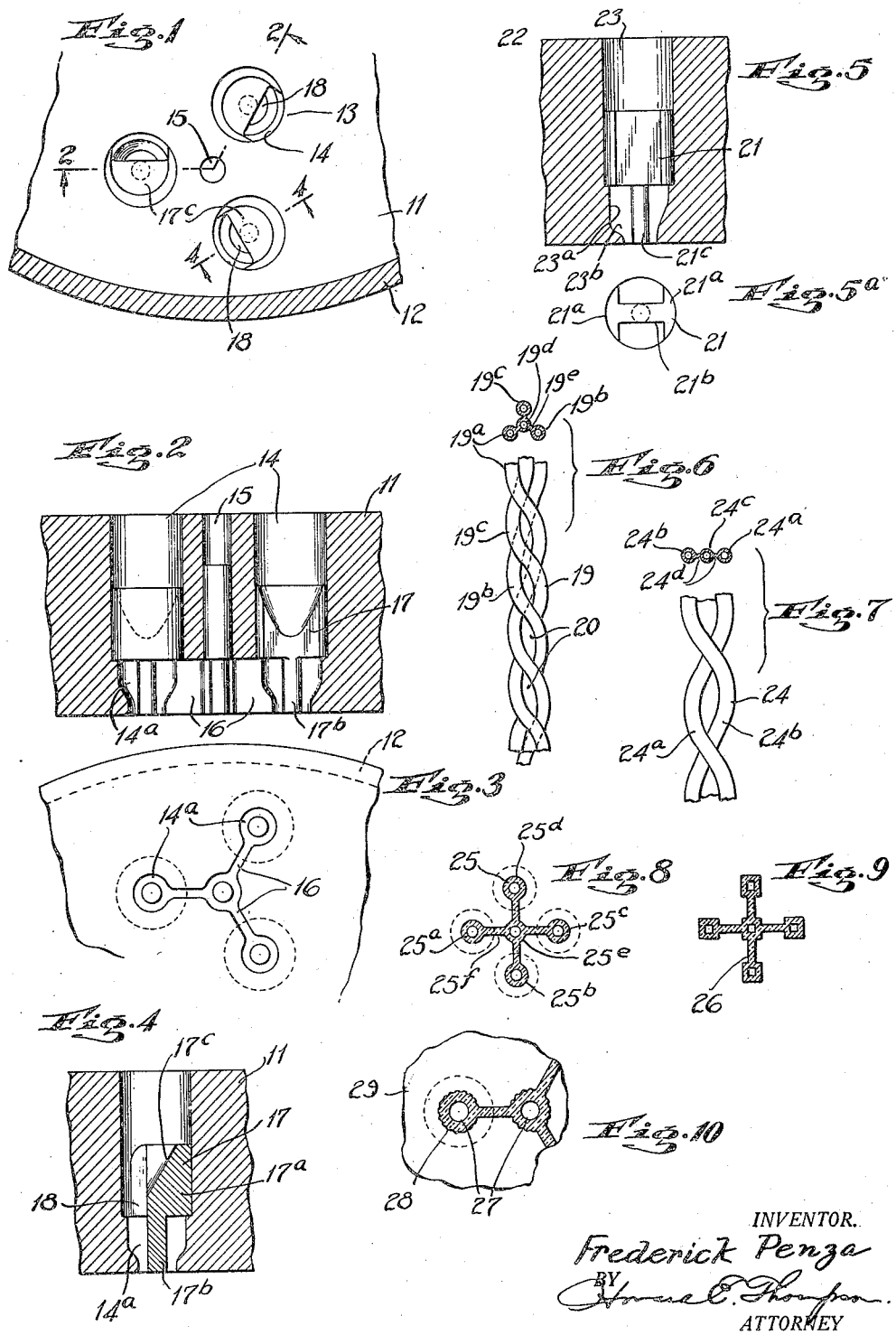

Patented Jan. 13, 1931

1,788,689

UNITED STATES PATENT OFFICE

FREDERICK PENZA, OF BROOKLYN, NEW YORK

METHOD AND APPARATUS FOR MAKING MACARONI

Application filed May 28, 1930. Serial No. 456,456.

This invention relates to a method of making macaroni and particularly to the provision of a new type of apparatus or die whereby a distinctly novel type of product may be produced, and particularly a product representing a twisted, rope-like body; and the object of the invention is to provide a die structure consisting of a plurality of groups of mold or die passages arranged in series of two, three, four or more, and to so arrange the transmission of the dough through the die and the separate groups of die passages as to form from each group, a twisted, rope-like product, consisting of a plurality of independent tubular passages joined by connecting webs or fins; a further object being to so construct the bores of the die or the die pins employed in said bores, as to cause the tubular portions of the product to be discharged therefrom in a curved path to produce the twisted, rope-like effect; a further object being to provide an improved type of die pin for facilitating the production of a macaroni product of the class specified; and with these and other objects in view, the invention consists in an apparatus for and method of producing macaroni, which is more fully hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of a die showing one group of die bores or passages arranged therein.

Fig. 2 is a section on the line 2—2 of Fig. 1.

Fig. 3 is a bottom, plan view of the structure shown in Figs. 1 and 2.

Fig. 4 is a partial section on the line 4—4 of Fig. 1.

Fig. 5 is a view similar to Fig. 4 showing a modification.

Fig. 5a is a plan view of the die pin shown in Fig. 5.

Fig. 6 is a sectional, plan and side view of a macaroni product made from a die structure such as shown in Figs. 1 to 4 inclusive.

Fig. 7 is a view similar to Fig. 6 showing a modified form of product.

Figs. 8 and 9 are sectional, plan view of other forms of products which I may produce; and, Fig. 10 is a view similar to Fig. 3 showing only a part of the construction and showing a modification.

In the production of macaroni, it is a common practice to provide a die plate having a multiplicity of bores or passages arranged vertically therein and to place upon the upper face of the die plate, the dough employed in the production of macaroni and to force this dough through the bores or passages by subjecting the dough to the pressure of a plunger or in any other desired manner, it being understood that the die plate is arranged at the lower end of a cylinder in which the plunger operates.

This practice is conventional and well known in the art and for this reason, I have illustrated only that part of the apparatus to which my invention relates. In Figs. 1 to 4 inclusive, I have shown at 11 a die plate, only part of which is shown, and at 12 I have indicated a portion of the cylinder in which the plate 11 is arranged. Formed in the die plate 11 are a plurality of groups 13 of bores or passages, a group of three being shown in Figs. 1 to 3 inclusive. Each bore 14 in the group is of similar construction and equally spaced radially and circumferentially with respect to the central bore or passage 15. The bores 14 are relatively large at their upper ends and terminate in contracted discharge ports 14a opening through the lower face of the die plate. The ports 14a partially control the contour of the product discharged therefrom. These ports are placed in communication with each other through relatively thin passages 16 which register with the central bore 15 as clearly seen in Fig. 3 of the drawing, the passages 16 being formed only at the lower face of the die plate 11 and extending from the base of the bores 14 proper, outwardly through the lower face of the die.

Arranged in each of the bores 14 are die pins 17, the structure of which is identical and the brief description of one pin will apply to all of said pins. The pins 17 consist of a large, semicircular head portion 17a and a central downwardly projecting pin 17b which is arranged in the ports 14a and arranged centrally with respect thereto to form at the discharge end of said ports a circumferential passage whereby the product discharged from the die plate will be tubular in form.

The semicircular heads 17a have a beveled upper end portion as seen at 17c whereby the dough pressed through the bores 14 will be directed to one side of said bores and enter the ports 14a through passages 18, note especially Fig. 4 of the drawing. These passages 18 are arranged at one side of each of the bores 14 and in a plane at right angles to a plane extending transversely through the axis of the bores 14 and the bore 15. By virtue of this arrangement of the die pins 17 in the groups of bores 14, there will be a tendency to feed the dough faster at one side of the resulting tubular body than at the other side thereof, thus causing the product to scribe an arc-shaped path in its discharge from the ports 14a, thus producing the twisted, rope-like effect illustrated in the product 19 shown in Fig. 6 of the drawing. In this figure, it will be seen that the resulting product will consist of three external tubular portions 19a, 19b, and 19c, all joining a central tubular portion 19d through connecting fins or webs 19e. It will thus be seen that the resulting product will form a body of macaroni, the cross section of which is such that substantially the same thickness of the product is formed throughout the entire cross sectional area thereof, thus facilitating the proper and even cooking of the product, it being apparent that the separate twisted coils are spaced apart by the connecting webs or fins 19e to form the space indicated at 20, in Fig. 6.

The same result produced by the pins 17 may be produced by pins 21 of more or less conventional form as shown in Figs. 5 and 5a, the only difference required in the use of the pins 21 being that the die plate 22 will have bores 23 therein similar to the bores 14 except that the lower discharge ports 23a of said bores, instead of being of the same cross sectional form through the length thereof as in Figs. 2 and 4 of the drawing will be modified so as to form at one side thereof large chambers 23b which will be equivalent to the passages 18 in their arrangement with respect to the bores so as to provide a freer feed of dough through the ports 23a where the enlargements 23b are formed to produce the spiral or twisted effect in the resulting product as shown in Fig. 6 of the drawing. The die pins 21 have two arc-shaped side portions 21a joined by a transverse rib 21b arranged centrally of the bore 23, thus forming the head structure of the pin. Extending downwardly from the central portion of the rib 21b is a pin 21c similar in all respects to the pin 17b.

In Fig. 7 of the drawing, I have shown the macaroni product 24 formed by the use of two mold bores or passages instead of three. In this construction, two tubular bodies 24a and 24b will be arranged in twisted spiral fashion and joined by a central tubular portion 24c and connecting fins 24d.

In like manner, a twisted body may be formed by the use of four bores or passages in the die plate so as to provide a macaroni product such as indicated in cross section at 25 in Fig. 8 of the drawing, composed of four tubular bodies 25a, 25b, 25c and 25d, joining a central tubular body 25e through fins or webs 25f.

In Fig. 9 of the drawing, I have shown another modification which differentiates from the structure shown in Fig. 8 simply in the production of a macaroni product 26 wherein the tubular portions are rectangular in cross sectional form instead of cylindrical. In this connection, it will be understood that any desired cross sectional form may be produced in the tubular bodies of the resulting product.

As a further example, I have illustrated in Fig. 10 of the drawing, the provision of a corrugated or rib-like exterior structure 27 to the outer tubular bodies of the finished product as well as to the central tubular body. This result may be readily accomplished by milling or otherwise forming corrugations 28 in the discharge ports of the die plate 29, part of which is illustrated in Fig. 10 of the drawing.

From the foregoing, it will be apparent that the distinctive features of my improved method of producing a macaroni product, especially a product of this kind having new contour and characteristics, reside in the provision of means for feeding the paste more readily through one side of the bores in each group so as to discharge the tubular bodies from said bores or ports in a curved path, which results in the automatic twisting of the product, producing a braided or rope-like appearance, and still further, to producing this result in each manner as to arrange the separate tubular portions of the product in spaced relation to each other by means of a connecting fin or web so that the wall thickness of the resulting product will be substantially the same through the cross sectional area of the product, facilitating the accurate and uniform cooking of the product.

It will be understood that while I have shown certain details of construction for carrying my invention into effect, that I am not necessarily limited to these details, and various changes therein and modifications thereof may be made within the scope of the appended claims without departing from the spirit of my invention or sacrificing its advantages.

Having fully described my invention, what I claim as new and desire to secure by Letters Patent, is:—

1. A die for machines of the class described having a plurality of mold passages arranged in group formation, means in said passages for controlling the discharge of a product through said passages whereby a single product consisting of a plurality of tubular bodies joined by an intermediate web structure may be formed, and means whereby the feed of the product through said passages will be faster at one side of each tubular body to form of the resulting product a braided or twisted arrangement of said tubular bodies with respect to each other.

2. A die for use in the production of a rope-like macaroni product, said die having a group arrangement of mold passages into and through which the dough employed is adapted to be passed under pressure, means in the mold passages for forming a tubular discharge of the dough at the discharge end of said passages, and means for increasing the feed of the dough at one side of each passage in a respective group to cause the tubular discharge to pass through a curved path in its discharge from the die to provide a coiled or braided effect between the several tubular bodies discharged from each group of passages.

3. A die for use in the production of a rope-like macaroni product, said die having a group arrangement of mold passages into and through which the dough employed is adapted to be passed under pressure, means in the mold passages for forming a tubular discharge of the dough at the discharge end of said passages, and means for increasing the feed of the dough at one side of each passage in a respective group to cause the tubular discharge to pass through a curved path in its discharge from the die to provide a coiled or braided effect between the several tubular bodies discharged from each group of passages, and means at the lower end of the die and in communication with the passages of each group for forming intermediate coupling webs joining said tubular bodies with each other.

4. A die for use in the production of a rope-like macaroni product, said die having a group arrangement of mold passages into and through which the dough employed is adapted to be passed under pressure, means in the mold passages for forming a tubular discharge of the dough at the discharge end of said passages, and means for increasing the feed of the dough at one side of each passage in a respective group to cause the tubular discharge to pass through a curved path in its discharge from the die to provide a coiled or braided effect between the several tubular bodies discharged from each group of passages, means at the lower end of the die and in communication with the passages of each group for forming intermediate coupling webs joining said tubular bodies with each other and means centrally of the first named passages in each group for forming a tubular body intermediate the first named bodies.

5. A macaroni product consisting of a plurality of tubular strand-like bodies arranged in twisted and spaced relation with respect to each other.

6. A macaroni product consisting of a plurality of tubular strand-like bodies arranged in twisted and spaced relation with respect to each other, said bodies being spaced apart and joined by a connecting web.

7. A macaroni product consisting of a plurality of strand-like bodies arranged in twisted and spaced relation with respect to each other, said bodies being spaced apart and joined by a connecting web, and said bodies being tubular in cross sectional form and the central part of said web being tubular.

8. The herein described method of manufacturing a plastic product consisting of a plurality of relatively coiled bodies, which consists in passing the material from which the product is formed through a group arrangement of mold passages, feeding such material at a greater rate of speed through one side section of each mold passage of said group to discharge bodies from said passages in curved relation to each other to produce a twisted arrangement of the bodies in said group with respect to each other in the finished product.

9. The herein described method of manufacturing a plastic product consisting of a plurality of relatively coiled bodies, which consists in passing the material from which the product is formed through a group arrangement of mold passages, feeding such material at a greater rate of speed through one side section of each mold passage of said group to discharge bodies from said passages in curved relation to each other to produce a twisted arrangement thereof in the finished product, and forming intermediate said bodies, spacing and coupling webs.

10. The herein described means of producing a rope-like body of macaroni which consists in feeding the macaroni dough through a grouped arrangement of mold passages to discharge from said passages a plurality of connected, tubular strands, and regulating the discharge of said strands through the mold passages in such manner as to cause the separate strands to twist with respect to each other to form said rope-like body.

11. The herein described means of producing a rope-like body of macaroni which consists in feeding the macaroni dough through a grouped arrangement of mold passages to discharge from said passages a plurality of connected, tubular strands, regulating the discharge of said strands through the mold passages in such manner as to cause the separate strands to twist with respect to each other to form said rope-like body, and forming a web structure intermediate said tubular strands for spacing said strands one from the other in the twisted arrangement thereof.

12. The herein described method of manufacturing a rope-like body of macaroni which consists in passing macaroni dough through a forming die in such manner as to discharge a plurality of tubular strands therefrom joined by a connecting and spacing web structure, and regulating the discharge of the dough in such manner as to automatically form a twisted arrangement of the strands with respect to each other to form a rope-like body.

13. The herein described method of manufacturing a rope-like body of macaroni which consists in passing macaroni dough through a forming die in such manner as to discharge a plurality of tubular strands therefrom joined by a connecting and spacing web structure, and regulating the discharge of the dough in such manner as to automatically form a twisted arrangement of the strands with respect to each other to form a rope-like body, and forming a tubular portion centrally of said connecting web and intermediate said tubular strands.

14. A die for machines of the class described having a plurality of mold passages arranged in independent group formation, each group consisting of two or more passages, means in each of said passages for controlling the discharge of a product therethrough whereby a single product consisting of a plurality of tubular bodies joined by an intermediate web structure may be formed and discharged from each group of passages.

15. A die for producing a twisted, rope-like product, said die having a group arrangement of mold passages adapted to form a plurality of tubular body portions, means whereby the passage of the substance employed in the production of said product through said passages will produce a braid or twisted arrangement of tubular body portions discharged from the respective passages in said group.

16. A die for producing a twisted, rope-like product, said die having a group arrangement of mold passages adapted to form a plurality of tubular body portions, means whereby the passage of the substance employed in the production of said product through said passages will produce a braid or twisted arrangement of tubular body portions discharged from the respective passages in said group, and means in the die at the discharge end of said group of passages for forming web portions joining said tubular bodies with each other.

17. A die for producing a twisted, rope-like product, said die having a group arrangement of mold passages adapted to form a plurality of tubular body portions, means whereby the passage of the substance employed in the production of said product through said passages will produce a braid or twisted arrangement of tubular body portions discharged from the respective passages in said group, means in the die at the discharge end of said group of passages for forming web portions joining said tubular bodies with each other, and means for forming a tubular body centrally of the web structure.

In testimony that I claim the foregoing as my invention I have signed my name this 23rd day of May, 1930.

FREDERICK PENZA.